United States Patent
Morvay et al.

(10) Patent No.: US 10,503,850 B2
(45) Date of Patent: Dec. 10, 2019

(54) GENERATION OF A MAP OF A SUBSTRATE USING ITERATIVE CALCULATIONS OF NON-MEASURED ATTRIBUTE DATA

(71) Applicant: Tokyo Electron Limited, Tokyo (JP)

(72) Inventors: Daniel Morvay, Mechanicville, NY (US); Taejoon Han, Clifton Park, NY (US)

(73) Assignee: Tokyo Electron Limited, Tokyo (JP)

( * ) Notice: Subject to any disclaimer, the term of this patent is extended or adjusted under 35 U.S.C. 154(b) by 230 days.

(21) Appl. No.: 15/484,436

(22) Filed: Apr. 11, 2017

(65) Prior Publication Data

US 2018/0144078 A1 May 24, 2018

Related U.S. Application Data

(60) Provisional application No. 62/425,186, filed on Nov. 22, 2016.

(51) Int. Cl.
| | |
|---|---|
| *G06F 17/50* | (2006.01) |
| *G06F 9/445* | (2018.01) |
| *G03F 7/20* | (2006.01) |
| *H01L 21/67* | (2006.01) |

(52) U.S. Cl.
CPC ............ *G06F 17/5036* (2013.01); *G03F 7/70* (2013.01); *G03F 7/70866* (2013.01); *G03F 7/70875* (2013.01); *G06F 2217/16* (2013.01); *H01L 21/67248* (2013.01); *H01L 21/67253* (2013.01)

(58) Field of Classification Search
CPC ... G03F 7/70458; G03F 7/70438; G06F 16/40
USPC ................................................ 703/2, 5, 19, 6
See application file for complete search history.

(56) References Cited

U.S. PATENT DOCUMENTS

| | | | | |
|---|---|---|---|---|
| 5,978,804 | A * | 11/1999 | Dietzman | G06F 16/40 |
| 6,873,938 | B1 * | 3/2005 | Paxton | G03F 7/70558 |
| | | | | 438/33 |
| 7,261,983 | B2 * | 8/2007 | Smith | G03F 7/70458 |
| | | | | 356/399 |
| 9,177,873 | B2 | 11/2015 | Vaid et al. | |
| 9,494,535 | B2 | 11/2016 | Sezginer et al. | |
| 9,989,858 | B2 * | 6/2018 | Slotboom | G03F 9/7046 |
| 2005/0075819 | A1 * | 4/2005 | Paxton | G03F 7/70558 |
| | | | | 702/117 |
| 2007/0072091 | A1 * | 3/2007 | Smith | G03F 7/70458 |
| | | | | 430/5 |

(Continued)

OTHER PUBLICATIONS

C. E. Rasmussen, et al., "Gaussian Processes for Machine Learning," the MIT Press, 2006, pp. 1-266, ISBN 026218253X.

(Continued)

*Primary Examiner* — Thai Q Phan
(74) *Attorney, Agent, or Firm* — Oblon, McClelland, Maier & Neustadt, L.L.P.

(57) ABSTRACT

Described herein are technologies to facilitate the generation and presentation of a map of an attribute of a substrate, such as a semiconductor wafer. Using the data of measured attribute (e.g., thickness, temperature, etc.) of a substrate, one or more of the described implementations generate data of non-measured (i.e., calculated) attributes to complete a map of the substrate using model parameters and a correlations model, such as a squared exponential Gaussian process model.

17 Claims, 5 Drawing Sheets

(56) References Cited

U.S. PATENT DOCUMENTS

| | | | |
|---|---|---|---|
| 2007/0216902 A1* | 9/2007 | Smith | G03F 7/70458 |
| | | | 356/401 |
| 2014/0297211 A1 | 10/2014 | Pandev et al. | |
| 2015/0033201 A1 | 1/2015 | Vaid et al. | |
| 2015/0241790 A1 | 8/2015 | Pierson et al. | |
| 2015/0300965 A1 | 10/2015 | Sezginer et al. | |
| 2016/0161941 A1* | 6/2016 | Koshida | G05B 19/402 |
| | | | 700/112 |
| 2016/0282105 A1 | 9/2016 | Pandev | |

OTHER PUBLICATIONS

Peter Sollich, et al., "Understanding Gaussian Process Regression Understanding Gaussian Process Regression," Dept of Mathematics, King's College London, Strand, London WC2R 2LS, U.K, and School of Informatics, University of Edinburgh, 5 Forrest Hill, Edinburgh EH1 2QL, U.K., pp. 1-19.

International Search Report and Written Opinion of the International Searching Authority dated Mar. 12, 2018 in PCT/US2017/062716, 12 pages.

* cited by examiner

GENERATION OF A MAP OF A SUBSTRATE USING ITERATIVE CALCULATIONS OF NON-MEASURED ATTRIBUTE DATA

CROSS-REFERENCE TO RELATED APPLICATIONS

This application is related to and claims priority to U.S. Provisional Application No. 62/425,186, filed Nov. 22, 2016, the entire contents of which are herein incorporated by reference.

BACKGROUND

There are many steps involved in the typical manufacturing process of semiconductor wafers. For example, the typical incoming wafer (e.g., bare silicon wafer) starts with a deposition of an insulating layer (i.e., a dielectric film, such as glass). After that, a layer of a pattern mask is laid down on the insulating layer using lithography. Then, materials are selectively removed from these layers using etching. After that, the photoresist mask is removed (i.e., strip) and the residues and particles are removed (i.e., clean or polish). Finally, conducting material is deposited (i.e., deposition) for each semiconductor device of the wafer. In short, the simplified and typical steps include deposition, lithography, etch, strip, clean, and deposition. Of course, frequently, many of these steps are repeated to form multiple layers.

It is common for a sample of the manufactured wafers to be measured and examined after one or more of these steps to confirm that it falls within an acceptable range of post-step error or non-uniformity. In order to quickly identify and correlate any post-step error or non-uniformity, the system tracks various operating variables (e.g., event timing, gas pressure, concentrations, temperatures, etc.) during the manufacturing process.

To help a user see any post-step error or non-uniformity of a wafer, conventional approaches utilize a colorful graphical depiction of the wafer condition (i.e., wafer map). More particularly, the conventional approaches generate the wafer map based upon a limited set of data points on the wafer itself. This is so because the wafer measurements may be time-consuming. For example, using an atomic force microscope or scanning electron microscope just a few measurements (e.g., perhaps a dozen) of a single wafer consume ten to twenty minutes.

Using this limited set of data points, the conventional approach uses spline interpolation (i.e., spline method) to predict/estimate values between measured data points. Starting from the center of the circular wafer, the spline calculations move outward radially in a manner to fit the measured data points as best as possible.

SUMMARY

Described herein are technologies to facilitate the generation and presentation of a map of an attribute of a substrate, such as a semiconductor wafer. Using the data of measured attribute (e.g., thickness, temperature, etc.) of a substrate, one or more of the described implementations generate data of non-measured (i.e., calculated) attributes to complete a map of the substrate using model parameters and a correlations model, such as a squared exponential Gaussian process model.

BRIEF DESCRIPTION OF THE DRAWINGS

FIGS. 3A-5C illustrate another example process illustrating the technology as described herein.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein are technologies to facilitate the generation and presentation of a map of an attribute of a substrate, such as a semiconductor wafer. Doing so helps aid in the understanding of substrate's behavior. Generally, measuring of substrates slows down the overall manufacturing process of such substrates. These measurements increase cycle time but provide critical decision-making data regarding the whether and how the substrate is responding/performing during the manufacturing processes.

With one or more implementations described herein, the attribute of a substrate is measured after some part (i.e., step) of the semiconductor wafer manufacturing process is performed. Examples of such an attribute of the substrate include thickness, roughness/texture, resistivity, temperature, cross-section and the like.

With one or more implementations described herein, a map-generating computing system determines model parameters of a correlation model. An example of a correlation model includes squared exponential Gaussian process model. Computations that use the squared exponential Gaussian process model accurately model the substrate measurements by only starting with a few actual measurements. The squared exponential Gaussian process model provides a framework for iteratively calculating non-measured data points, referencing collected data, comparing against previous calculations to minimize calculated error.

With one or more implementations described herein, the map-generating computing system processes the measured attribute data to generate the correlation model.

With one or more implementations described herein, the map-generating computing system iteratively calculates non-measured attribute data of the substrate. The non-measured attribute data of the substrate represents attributes of the substrate that are calculated based on the model parameters and the correlation model, such as the squared exponential Gaussian process model.

With one or more implementations described herein, the map-generating computing system determines calculation errors with each iteration of the iterative calculations. The iterative calculations are performed until the calculation errors fall within specified error range or, alternatively, meets a predefined threshold (i.e., criterion).

With one or more implementations described herein, the map-generating computing system displays a map (e.g., a topographical map) of the substrate for viewing by a user. The map includes the measured and non-measured attribute data.

Figure 1:
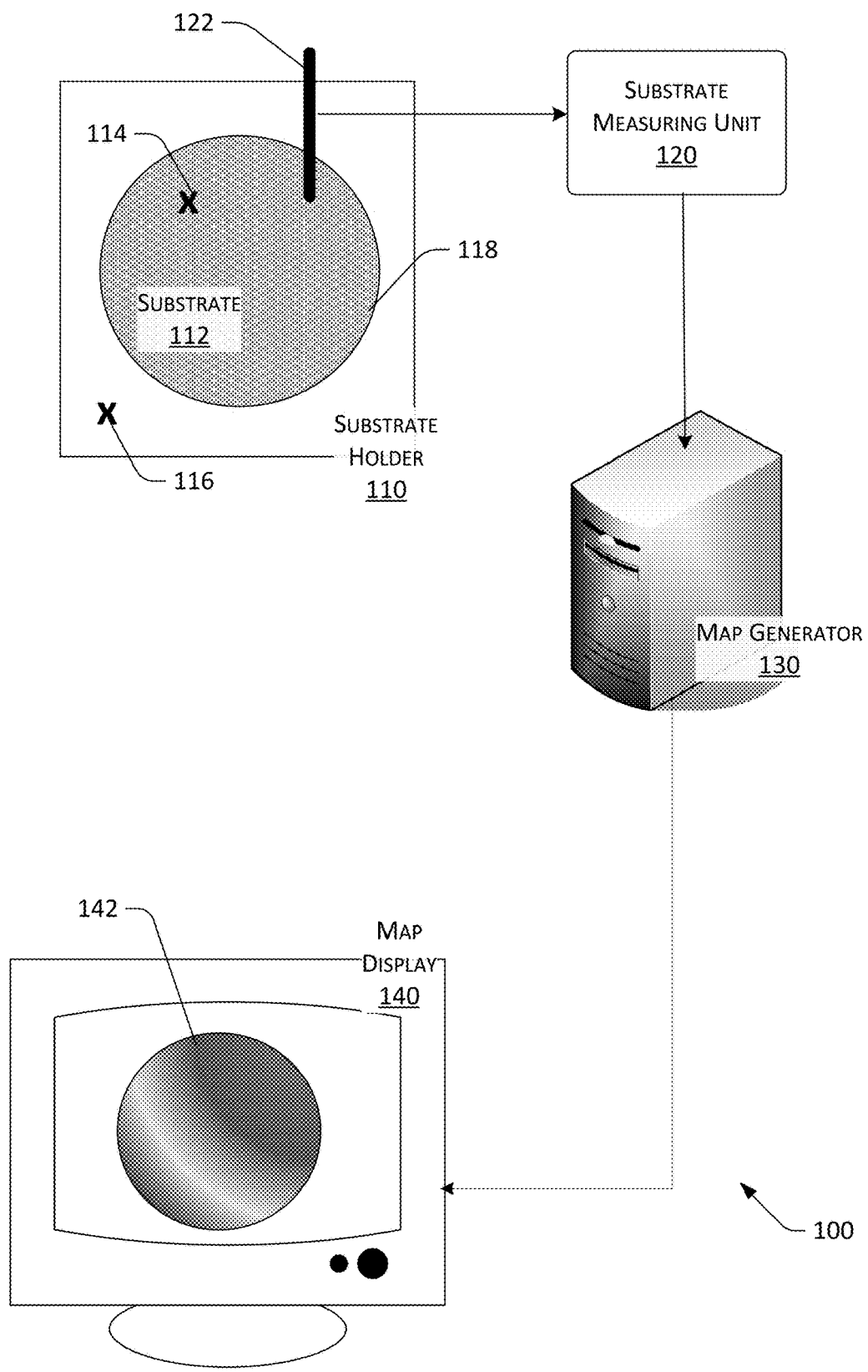
FIG. 1 illustrates an example map-generation system in accordance with the technology described herein.

FIG. 1 shows an example map generation system 100 in accordance with one or more implementations described herein. The example map generation system 100 includes a substrate holder 110, a substrate measuring unit 120, a map generator 130 (i.e., map-generating computing system), and a map display 140.

The substrate holder 110 designed to hold a substrate 112 (e.g., a semiconductor wafer) for measurement of one or more of its attributes. Typically, a substrate is selected for measurement after some part (i.e., step) in the manufacturing process. For example, the substrate 112 may be measured after an insulating layer is applied.

The substrate measuring unit 120 includes the components needed to make a physical measurement of one or more attribute of the substrate. Substrate measuring unit 120 produces measured attribute data (e.g., measured values) based upon the measured attributes. To accomplish the measuring, the substrate measuring unit 120 may, for example, use a stylus 122 to tactically measure roughness/texture of the substrate 112. Other examples of the substrate measuring unit 120 may include an atomic force microscope or a scanning electron microscope.

The attributes of the substrate 112 that are measured by the substrate measuring unit 120. Examples of attributes of the substrate (or a portion thereof) that may be measured include (but are not limited to): thickness, roughness/texture, resistivity, temperature, and cross-section.

The substrate measuring unit 120 and substrate holder 110 are designed to enable measurements of attributes of the substrate 112 within the periphery 118 of the substrate. For example, the substrate measuring unit 120 may measure the temperature of the substrate 112 at point 114 on the substrate. In some implementations, the substrate measuring unit 120 and the substrate holder 110 are designed to enable measurements of attributes of the substrate 112 at or outside the periphery 118 of the substrate. For example, the substrate measuring unit 120 may measure the temperature outside or off the substrate 112 at point 116 on the substrate. This may be useful as a control datapoint.

The map generator 130 (i.e., map-generation computing system) obtains the measured attribute data of the substrate from substrate measuring substrate measuring unit 120 or a database/memory. The measured attribute data represents measured attributes of the substrate.

The map generator 130 determines model parameters of a correlation model. Herein, model parameters include prediction equations where the parameters are the coefficients multiplied by the measurement values. An example of a model parameter includes (m*x) in the equation y=(m*x)+b. y is measured transfer time and x is file size (in MB).

Herein, a correlation model is a reference to the wafer measurement values versus the prediction values, and the correlation coefficient and Rsquared ($R^2$) generated from the prediction equation. An example of a correlation model includes squared exponential Gaussian process model.

Computations that use the squared exponential Gaussian process model accurately model the substrate measurements by only starting with a few actual measurements. The squared exponential Gaussian process model provides a framework for iteratively calculating non-measured attribute data points, referencing collected data, comparing against previous calculations to minimize calculated error.

The map generator 130 processes the measured attribute data to generate the correlation model. Then, it iteratively calculates non-measured attribute data of the substrate. The non-measured attribute data of the substrate represents attributes of the substrate that are calculated based on the model parameters and the correlation model, such as the squared exponential Gaussian process model.

The map generator 130 determines calculation errors with each iteration of the iterative calculations. The iterative calculations are performed until the calculation errors fall within specified error range or, alternatively, meets a predefined threshold (i.e., criterion). The map generator 130 determines calculation errors with each iteration of the iterative calculations. The calculation errors are determined based on a comparison of subsequent iterative calculations.

The map generator 130 may store the measured and non-measured attribute data in a primary or secondary storage system (not shown). It may store that data as part of a map of the measured and non-measured attribute data.

Alternatively, the map generator 130 displays a map (e.g., a topographical map) of the substrate for viewing by a user. The map includes the measured and non-measured attribute data.

As depicted, the map display 140 shows a map 142 of the attributes (both those measured and non-measured) of the substrate 112. Of course, in other implementations, the map 142 may be illustrated with different patterns, colors, intensity, angles, and dimensions.

When building a statistical model, the Rsquared value is checked. If the Rsquared value is near 1.00, then the model is an accurate fit. But as the Rsquared value degrades from 1.00, then the model is less accurate. For example, a Rsquared value of 0.2 indicates that the model is not a very good representation. In this situation, additional measurements may be necessary to produce a better model.

Figure 2:
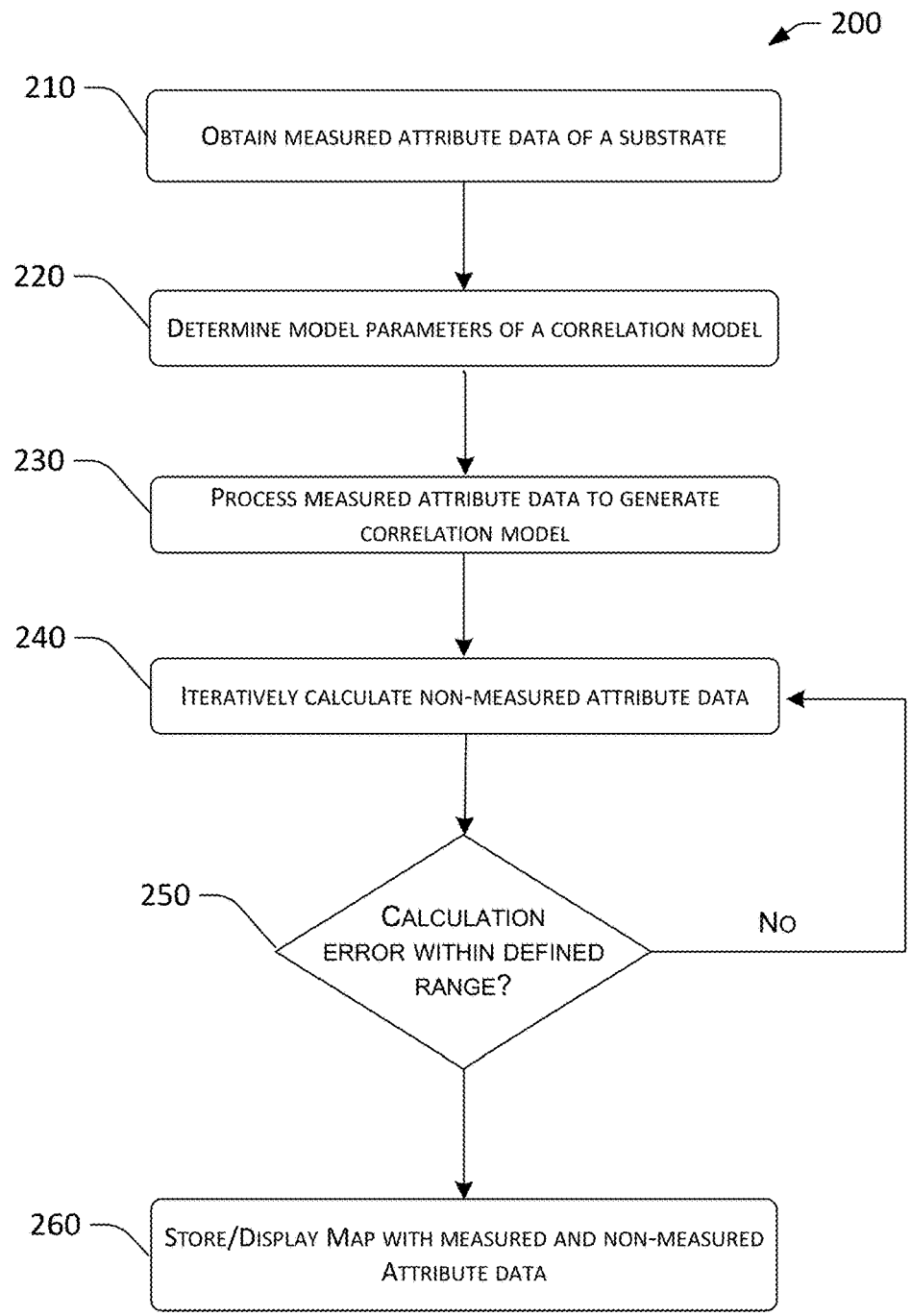
FIG. 2 is a flowchart of a methodological implementation of map generation in accordance with implementations described herein.

FIG. 2 shows an example process 200 illustrating the technology as described herein. The example process 200 may be implemented as part of a map-generation system like example system 100 described herein.

At 210, the map-generation system obtains measured attribute data of a substrate. The measured attribute data represents measured attributes of the substrate. Typically, the attribute of a substrate is measured after some part (i.e., step) of the semiconductor wafer manufacturing process is performed.

At 220, the map-generation system determines model parameters of a correlation model. An example of a correlation model includes squared exponential Gaussian process model.

To this end, the map-generation system calculates the scaled squared distances between the sampled points (for each measured attribute). The system normalizes the values by dividing by the standard deviation. The system creates the squares of the distance between sampled points.

At 230, the map-generation system processes the measured attribute data to generate the correlation model. Then, at 240, it iteratively calculates non-measured attribute data of the substrate. The non-measured attribute data of the substrate represents attributes of the substrate that are calculated based on the model parameters and the correlation model, such as the squared exponential Gaussian process model.

To this end, the system creates a single correlation model based on the sampled data points. In doing so, the system utilizes a statistical interpolation of spatial data (e.g., gaussian squared process, kriging, gaussian process regression, gaussian process for machine learning).

At 250, the map-generation system determines calculation errors with each iteration of the iterative calculations. The iterative calculations are performed until the calculation errors fall within specified error range or, alternatively, meets a predefined threshold (i.e., criterion). The map generator 130 determines calculation errors with each iteration of the iterative calculations. The calculation errors are determined based on a comparison of subsequent iterative calculations.

To that end, the system creates a topographic model based on the single model. The topographic model is created by iterating the remodel based on the single model while utilizing statistical interpolation of spatial data (e.g., gaussian squared process, kriging, gaussian process regression, gaussian process for machine learning). Thus, many iterative models are created. The system recombines the multiple models into one model.

At 260, the map-generation system stores the measured and non-measured attribute data in a primary or secondary storage system (not shown). It may store that data as part of a map of the measured and non-measured attribute data. Alternatively, the map-generation system displays a map (e.g., a topographical map) of the substrate for viewing by a user. The map includes the measured and non-measured attribute data.

FIGS. 3A-5C illustrate another example process illustrating the technology as described herein. The example process may be implemented as part of a map-generation system like example system 100 described herein.

Figures 3A, 3B, 3C:
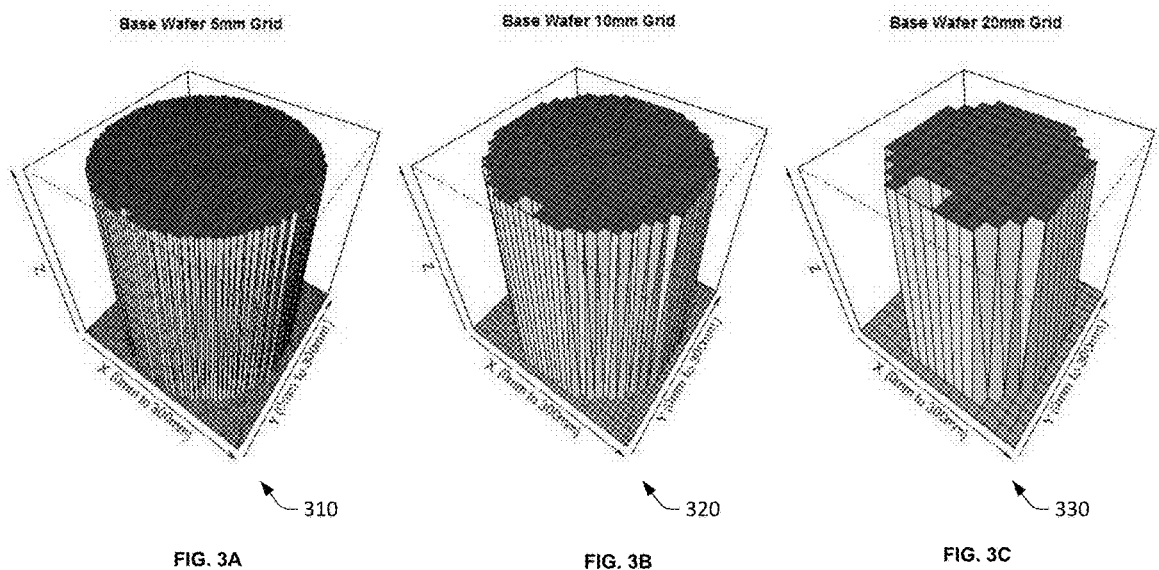

FIG. 3A-3C shows that the example process starts with a foundational wafer geometry. A grid size is selected. FIG. 3A, graph 310, shows an example base wafer with a 5-millimeter (mm) grid. FIG. 3B, graph 320, shows an example base wafer with a 10 mm grid. FIG. 3C, graph 330, shows an example base wafer with a 20 mm grid. Each graph represents a grid through which data is collected or obtained from the base wafer.

Figures 4A, 4B, 4C:
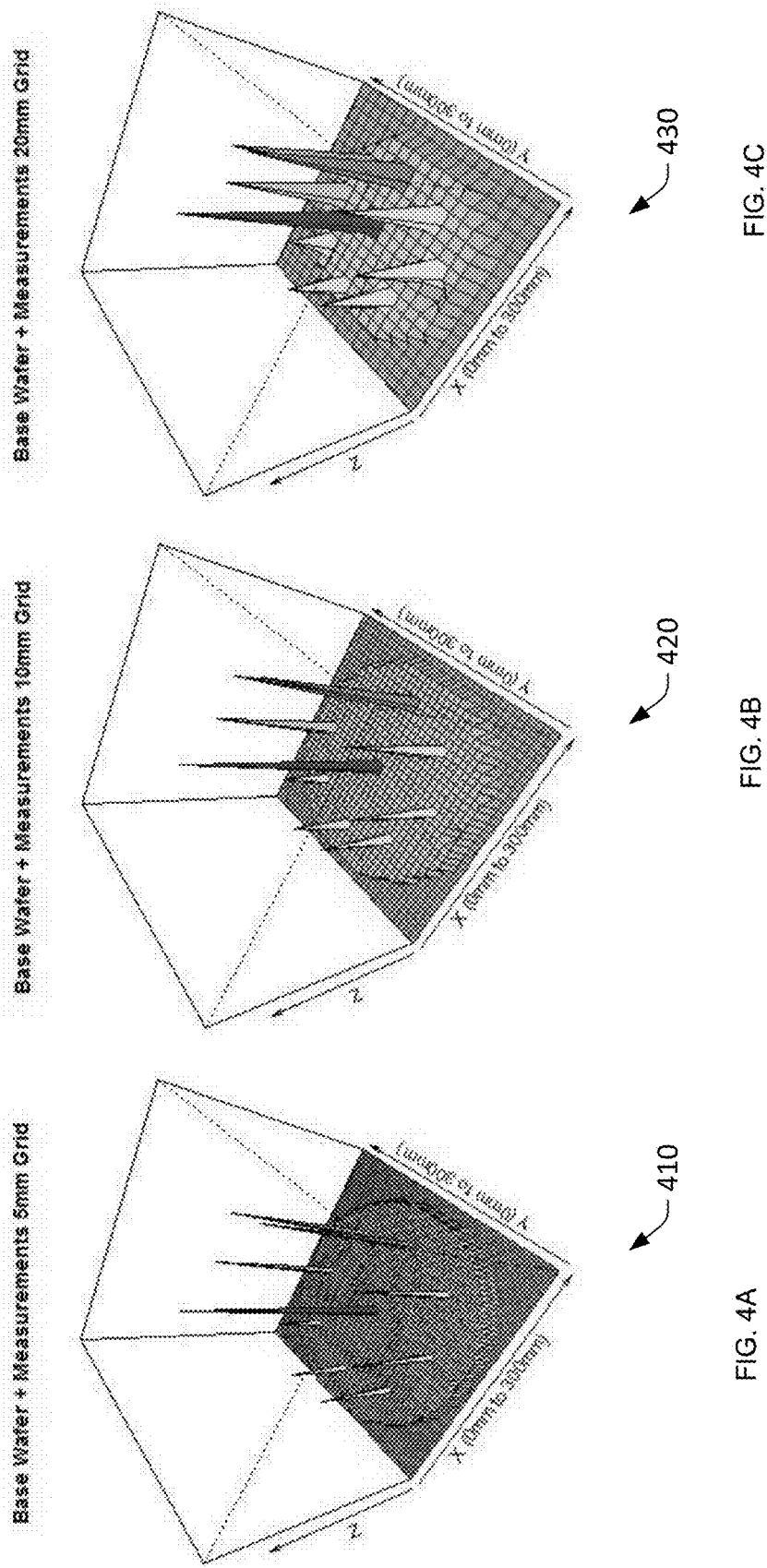

FIGS. 4A-4C shows that the wafer measurements are associated with the wafer base data. FIG. 4A, graph 410, shows the example base wafer of FIG. 3A, graph 310, with the collected measurements. FIG. 4B, graph 420, shows the example base wafer of FIG. 3B, graph 320, with the collected measurements. FIG. 4C, graph 430, shows the example base wafer of FIG. 3C, graph 330, with the collected measurements. This may be accomplished by plotting using a linear regression model to create a linear model (prediction equation model).

Figure 5C:
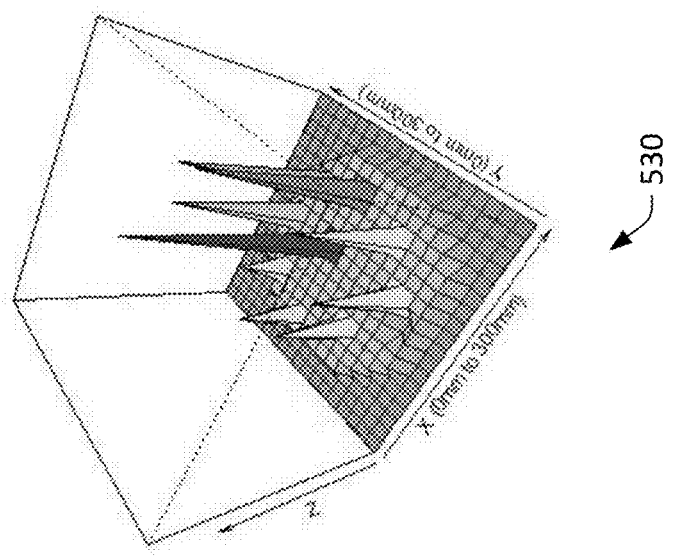
Figure 5B:
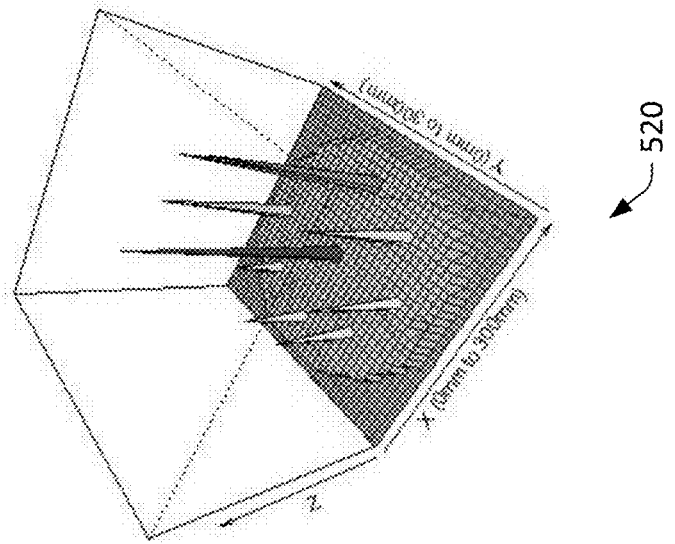
Figure 5A:
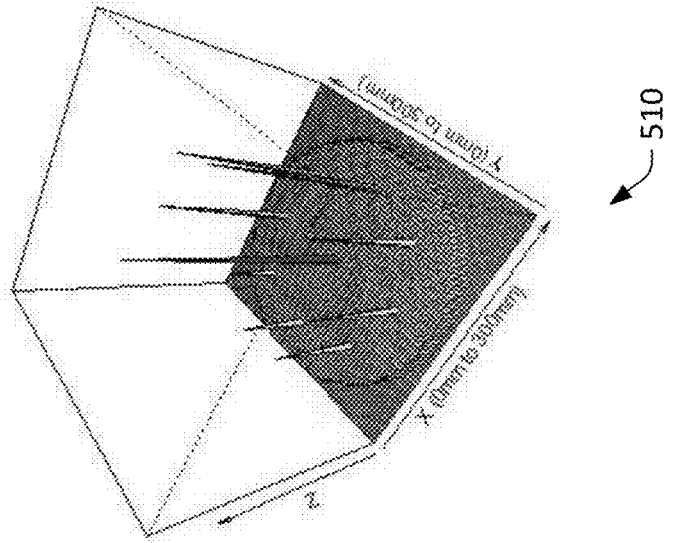

FIGS. 5A-5C shows the results of three different ways to produce a prediction model. FIG. 5A, graph 510, shows the prediction model based on use of the radial method where the linear model shape is an offset cone. FIG. 5B, graph 520, shows the prediction model based on use of the point to point method with linear model shape being a spiral staircase. FIG. 5C, graph 530, shows the prediction model based on use of the radial method where the non-linear model shape is a spiral far-east-roofline.

The prediction model is based on the prediction equation. Using the prediction equation of the prediction model, the predicted values are calculated to compare to the measured values. That equation is produced by starting with the wafer measurements and then filling in the point between measurements to create the prediction equation. The prediction equation is a model where the calculated points filled in are predicted or modeled points. The modeling method is how the measured points are connected and the prediction equation is created.

A plot of measured values versus predicted values is generated. Linear regression is used to determine the equation. Ideal equation of 1*x+0 for this correlation prediction equation model. The Pearson's correlation coefficient is calculated. In statistics, the Pearson correlation coefficient is a measure of the linear correlation between two variables X and Y. It has a value between +1 and −1, where 1 is total positive linear correlation, 0 is no linear correlation, and −1 is total negative linear correlation.

Rsquared is calculated as the coefficient of determination. In statistics, the coefficient of determination is a number that indicates the proportion of the variance in the dependent variable that is predictable from the independent variable(s).

As mentioned above, other techniques of statistical interpolation of spatial data such as kriging, gaussian process regression, gaussian process for machine learning, multivariate interpolation, and the like can also be used to generate the predicted values. Additional details for using squared exponential Gaussian process is available in Peter Solich, et al., "Understanding Gaussian Process Regression Using the Equivalent Kernel," Dept. of Mathematics, King's College London; and, School of Informatics, University of Edinburgh, pp. 1-19 and C. E. Rasmussen, et al., "Gaussian Processes for Machine Learning", MIT Press, 2006, ISBN 026218253X, 2006 Massachusetts Institute of Technology, pp. 82-96.

Reference herein to "one embodiment" or "an embodiment" refers to one or more features, structures, materials, or characteristics described at least one example embodiment of the technology described herein. It does not denote or imply that the features, structures, materials, or characteristics are present in every embodiment. Thus, the appearances of the phrases "in one embodiment" or "in an embodiment" in various places throughout this document are not necessarily referring to the same embodiment of the technology. Furthermore, the features, structures, materials, or characteristics may be combined in any suitable manner in one or more embodiments.

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" is non-transitory computer-storage media. For example, non-transitory computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)). Similarly, the term "machine-readable media" is non-transitory machine-storage media. Likewise, the term "processor-readable media" is non-transitory processor-storage media.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

In the claims appended herein, the inventors invoke 35 U.S.C. § 112(f) only when the words "means for" or "steps for" are used in the claim. If such words are not used in a claim, then the inventors do not intend for the claim to be construed to cover the corresponding structure, material, or acts described herein (and equivalents thereof) in accordance with 35 U.S.C. 112(f).

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

The invention claimed is:

1. A method that facilitates generation of map of an attribute of a substrate, the method comprising:
   obtaining measured attribute data of a substrate, the measured attribute data representing measured attributes of the substrate, and including measurements of locations outside a periphery of the substrate;
   determining model parameters of a correlation model;
   processing the measured attribute data to generate the correlation model;
   iteratively calculating non-measured attribute data of the substrate, wherein the non-measured attribute data of the substrate represents attributes of the substrate that are calculated based on the correlation model and the model parameters, and includes calculations of locations outside the periphery of the substrate;
   presenting a map of the substrate for viewing by a user, the map including the measured and non-measured attribute data.

2. The method as recited in claim 1 further comprising determining calculation errors with each iteration of the iterative calculations, wherein the iterative calculations are performed until the calculation errors fall within a specified error range.

3. The method as recited in claim 1 further comprising determining calculation errors with each iteration of the iterative calculations, wherein calculation errors are determined based on a comparison of subsequent iterative calculations.

4. The method as recited in claim 1 further comprising determining calculation errors with each iteration of the iterative calculations, wherein the iterative calculations are performed until the calculation errors meet a specified error criterion.

5. The method as recited in claim 1, wherein the correlation model is a squared exponential Gaussian process model.

6. The method as recited in claim 1, wherein the presenting includes storing a map of the substrate in a memory of a computer system.

7. The method as recited in claim 1, wherein the presenting includes storing a topographical map of the substrate in a memory of a computer system.

8. The method as recited in claim 1, wherein the presenting includes displaying a map of the substrate on a visual display system.

9. The method as recited in claim 1, wherein attributes represented by the measured and non-measured attribute data are selected from a group consisting of thickness of the substrate or a portion thereof, roughness of the substrate or a portion thereof, resistivity of the substrate or a portion thereof, temperature of the substrate or a portion thereof, and cross-section of the substrate or a portion thereof.

10. One or more computer-readable media storing instructions thereon that, when executed by one or more processors, direct the one or more processors to perform operations that facilitate generation of map of an attribute of a substrate, the operations comprising:
   obtaining measured attribute data of a substrate, the measured attribute data representing measured attributes of the substrate, and including measurements of locations outside a periphery of the substrate;
   determining model parameters of a correlation model;
   processing the measured attribute data to generate the correlation model;
   iteratively calculating non-measured attribute data of the substrate, wherein the non-measured attribute data of the substrate represents attributes of the substrate that are calculated based on the correlation model and the model parameters, and includes calculations of locations outside the periphery of the substrate;

presenting a map of the substrate for viewing by a user, the map including the measured and non-measured attribute data.

11. The one or more computer-readable media as recited in claim 10, wherein the operations further comprise determining calculation errors with each iteration of the iterative calculations, wherein the iterative calculations are performed until the calculation errors fall within specified error range.

12. The one or more computer-readable media as recited in claim 10, wherein the operations further comprise determining calculation errors with each iteration of the iterative calculations, wherein calculation errors are determined based on a comparison of subsequent iterative calculations.

13. The one or more computer-readable media as recited in claim 10, wherein the operations further comprise determining calculation errors with each iteration of the iterative calculations, wherein the iterative calculations are performed until the calculation errors meet a specified error criterion.

14. A method that facilitates generation of map of an attribute of a substrate, the method comprising:

obtaining measured attribute data of a substrate, the measured attribute data representing measured attributes of the substrate, and including measurements of locations outside a periphery of the substrate;

determining model parameters of a correlation model, the correlation model being a squared exponential Gaussian process model;

processing the measured attribute data to generate the correlation model;

iteratively calculating non-measured attribute data of the substrate, wherein the non-measured attribute data of the substrate represents attributes of the substrate that are calculated based on the squared exponential Gaussian process model and the model parameters, and includes calculations of locations outside the periphery of the substrate;

determining calculation errors with each iteration of the iterative calculations, wherein the iterative calculations are performed until the calculation errors fall within specified error range;

presenting a map of the substrate for viewing by a user, the map including the measured and non-measured attribute data.

15. The method as recited in claim 14, wherein calculation errors are determined based on a comparison of subsequent iterative calculations.

16. The method as recited in claim 14, wherein the presenting includes storing a map of the substrate in a memory of a computer system.

17. The method as recited in claim 14, wherein attributes represented by the measured and non-measured attribute data is selected from a group consisting of thickness of the substrate or a portion thereof, roughness of the substrate or a portion thereof, resistivity of the substrate or a portion thereof, temperature of the substrate or a portion thereof, and cross-section of the substrate or a portion thereof.

* * * * *